United States Patent [19]

Hölter et al.

[11] 4,295,868

[45] Oct. 20, 1981

[54] FILTER FOR CLEANING HOT GASES

[75] Inventors: Heinz Hölter, Gladbeck; Heinz Gresch, Dortmund-Derne; Heinrich Igelbüscher, Gladbeck; Kurt Hübner; Ekkehard Weber, both of Essen, all of Fed. Rep. of Germany

[73] Assignee: Industrie-Wert Beteiligungsgesellschaft mbH, Fed. Rep. of Germany

[21] Appl. No.: 19,371

[22] Filed: Mar. 9, 1979

[30] Foreign Application Priority Data

| | | |
|---|---|---|
| Mar. 17, 1978 [DE] | Fed. Rep. of Germany | 2811641 |
| May 22, 1978 [DE] | Fed. Rep. of Germany | 2822274 |
| Jul. 5, 1978 [DE] | Fed. Rep. of Germany | 2829412 |
| Jul. 5, 1978 [DE] | Fed. Rep. of Germany | 2829413 |
| Sep. 4, 1978 [DE] | Fed. Rep. of Germany | 2838476 |

[51] Int. Cl.$^3$ .................. B01D 27/30; B01D 33/30; B01D 39/06
[52] U.S. Cl. .................. 55/302; 55/474; 55/479; 55/350; 55/523; 55/524; 55/528
[58] Field of Search .................. 55/99, 474, 479, 282, 55/302, 466, 523, 524, 528, 482, 350, 485; 428/289; 427/217

[56] References Cited

U.S. PATENT DOCUMENTS

| | | | |
|---|---|---|---|
| 2,220,127 | 11/1940 | Slayter | 55/485 |
| 2,978,064 | 4/1961 | Deaver | 55/387 |
| 3,665,547 | 5/1972 | Boylan | 55/302 |
| 3,894,514 | 7/1975 | Caudill et al. | 55/99 |
| 3,927,165 | 12/1975 | Grochol et al. | 55/524 |
| 3,966,441 | 6/1976 | Freze | 55/282 |

Primary Examiner—Gregory N. Clements
Attorney, Agent, or Firm—James C. Wray

[57] ABSTRACT

In an apparatus for cleaning hot gases a filter housing has an inlet for unfiltered gas and an outlet for filtered gas. A plurality of filtered inserts are placed within the housing in a manner capable of filtering undesirable components from the gas feed stream. Each filter insert is made of a fibrous filter material. Silicic-acid glass fibers have a silicic acid content of at least 90%. Coated upon the fibers and absorbed into their pores is a metal oxide of aluminum, titanium, zirconium, cromium, nickle or cobalt. A honeycombed cage filled with high temperature resistant perlite is located within the housing between the gas inlet and the fiber inserts. The cage has an inlet and outlet external to the housing for replacing the perlite. A combustion chamber mounted in the housing has a discharge nozzle located so that the nozzle is directed at the filter inserts. Combusting materials in the chamber causes an explosive backflow of gases through the filter inserts.

4 Claims, 3 Drawing Figures

FILTER FOR CLEANING HOT GASES

The invention relates to a filter for cleaning hot gases with at least one filter insert of fibrous filter material. The fibers consist of silicic acid, where the weight ratio of silicic acid to non-silicic acid oxides of the fibers has been increased by treatment with a metallic salt or solution, so that a metallic compound which is transformed by heating into the metal-oxide is accumulated on the fibers.

For use in filters a fibrous filter material is already known, where the fibers consist of silicic acid glass which is treated in such a way that the non-silicic acid-oxides are mainly or almost completely removed from the fibers (GB-PS No. 1,041,996). For example, the fibers are treated with dilute hydrochloric acid at elevated temperatures; the fibers then are washed and sometimes dried.

Fibers containing 95% or more silica or $SiO_2$ have a higher temperature resistance than the fibers made of silicic acid glass. However, mechanical properties of silica fibers are inadequate for many applications, because the so-treated fibers are brittle and have little flexibility. Therefore, on those fibers are accumulated chromium compounds which will be transformed into $Cr_2O_3$ by thermal decomposition, thereby improving the mechanical properties of the glass fibers. In particular, the fibers are treated in a solution containing organic chromium compounds such as chromium acetate or chromium formate. The use of inorganic chromium compounds is not advisable, because a sufficient bonding or coating on the fibers does not occur during the heat treatment and the following transformation into $Cr_2O_3$. However, during the thermal decomposition of organic chromium compounds difficulties arise because exhaust gases which require special cleaning will develop during this process. Also the physical properties of fibers treated in such a manner still do not meet all the requirements expected from the fibers, particularly their flexibility, under stresses of heavy wear and tear and such as occur in high temperature filters. For example, gases developing during the coal gasification which are to be cleaned have temperatures of approximately 800° C. at a pressure of approximately 20 bar. Mechanical strain of the filter material and thereby the fibers in the filter cannot be avoided, especially during cleaning of the filters which conventionally is done by striking or swinging the filter parts.

This invention provides a filter wherein the fibrous filter material has better physical properties especially in reduced brittleness and increased flexibility at high temperatures.

The answer to the problem is that the metal oxides of those metals will accumulate on the fibers by treatment in a solution containing inorganic metallic salts of the metals Al, Ti, Zr, Cr Ni and/or Co, which are transformed into the respective metal-hydroxides by adding ammonia to that solution.

Surprisingly, it has been proven that the metal-hydroxides accumulated on the fibers still tightly bond to the surface of the glass fibers and penetrate into the pores of the glass fibers even after transformation into the corresponding metal-oxides, which pores develop during the preceding acid treatment. During the subsequent heat treatment, where the metal-hydroxides are transformed into the metal-oxides, an extraordinarily tight connection is formed between the metal-oxides and the glass fibers. Thus, by chosing the right metals, excellent mechanical, thermal and chemical properties of the glass fibers are achieved. The present fibers resist the expected wear and tear strains in high temperature filters without problems.

In a preferred form, the solution for the treatment of the fibers contains a metal-chloride as the metallic salt such as an anhydrous Ti $Cl_4$, Zr $Cl_4$ and/or Al $Cl_3$. The solution may contain several of those metal chlorides. If it is preferred that several of those metal oxides should be accumulated on the glass fibers, it might be practical to add to the solution an organic complexer such as glycine, which is, an amino acetic acid. The properties of glass fibers treated in this way will be improved if pressure is used when accumulating the metal hydroxide on the fibers.

Sometimes it can be advantageous to add silicic acid to the solution to increase the weight ratio of silicic acid to non-siliceous acids on the fibers. It is advisable to use highly pure, liquid silicic acid with a large specific surface.

The fibers which have been so treated can be processed into very fine-pored filter inserts, for example, filter mats with a webbed or felted structure, which are capable of filtering out very fine dust particles from the hot gases to be cleaned. Naturally, such fine-pore filter materials tend to clog, especially if the gases contain tarry or sticky adhesive materials. In order to avoid clogging of the filter materials, it is recommended to insert a layer of expanded perlite (which is an expanded calcium aluminum silicate) on the side of the filter which is toward the oncoming hot gases. This layer forms at the same time a protective shield in front of the filter insert which collects the tarry and/or sticky substances, as well as metal oxides and hot synthetic or plastic particles, thereby avoiding clogging of those materials in the filter material. The pressure loss caused by this perlite layer is negligible since it is usually less than 5–10 mm. of water.

It is practical to keep this layer of expanded perlite in a container or cage with an inlet and an outlet. The contents of this container can be replaced or renewed from time to time. However, it is also possible to continuously pass the expanded perlite through the container during the operation of the filter.

As mentioned above, when purifying very hot gases with filters, problems arise with cleaning the filter inserts. This is because the support and fixing devices for the filter inserts are already so highly stressed by the temperatures that they can barely withstand any additional stress. In this connection, it is suggested that a chamber open on one side be inserted in the direction of flow of the hot gases behind the filter insert which provides an inlet for air for combustion and/or fuel for combustion. This chamber should receive a combustible mixture which is periodically ignited, so that the resulting shock wave affects the filter inserts, especially the filter material, in such a way as to clean the filter material. If the filter is used for purifying gases which contain combustible components, then it is sufficient to periodically let a specific quantity of air for combustion into the chamber, so that the resulting combustion mixture in the chamber spontaneously ignites due to the high ambient temperature, causing a shock wave and a cleansing stream of gas. If gases are being purified which contain no combustible components, then a specific quantity of fuel, e.g., oil or gas, or a combustible mixture, can be let into the chamber periodically.

Preferably, the chamber has a discharge nozzle directed toward the filter insert so that the shock wave and cleansing stream of gas emerging from the chamber can have an optimum effect on the filter insert, i.e., the filter material.

When cleansing gases containing combustible materials, a pressure reservoir for combustible air can be added in front of the chambers where from time to time a certain amount of combustible air is released intermittently into the chamber. It is understood that the inlet for the combustible air and/or the fuel is furnished with a regulating valve. However, this valve is the only regulating device required for the operation of the chamber during cleaning of the filters.

DETAILED DESCRIPTION OF THE DRAWINGS

Figure 1:
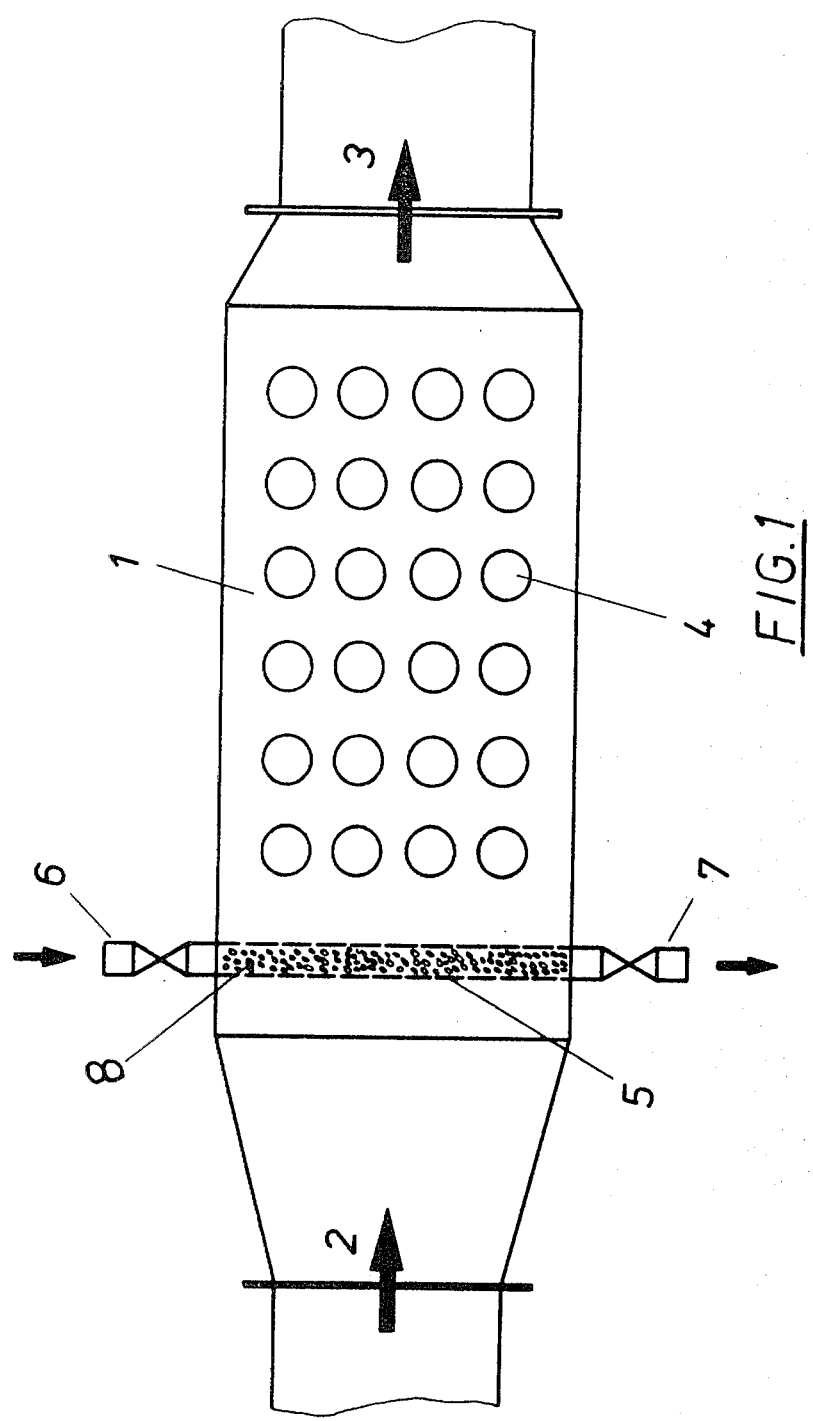
FIG. 1 is a schematic of a filter with several filter inserts for cleaning hot gases.

The filter 1 illustrated in FIG. 1 is inserted between a raw, unrefined gas line 2 and a pure or cleaned gas line 3. Inside the housing of the filter 1 several filter inserts 4 are installed through which the gas to be cleaned has to flow. The flow path of the gas is marked by arrows. In the flow direction of the hot gases in front of the filter inserts 4, a cage or container 5 of a honeycombed structure is installed covering the whole cross-section flow area. This cage is filled with expanded high temperature resistant perlite. Cage 5 has an inlet 6 and an outlet 7 so that the expanded perlite can be replaced intermittently, or so that the perlite can be moved continuously through the cage 5 during operation of the filter. The expanded perlite forms a layer 8 through which the raw gas has to flow. Layer 8 filters out from the unrefined gas tarry and sticky particles, or metal-oxides and inflammable plastic particles which should not stress or cause wear and tear on the filter inserts. The filter material is explained in more detail later. The layer 8 of expanded perlite causes a pressure loss which is less than 5–10 mm. of water. The expanded perlite is temperature resistant in excess of 1200° C. In case the expanded perlite is worn out, it can be regenerated by sintering.

Figure 2:
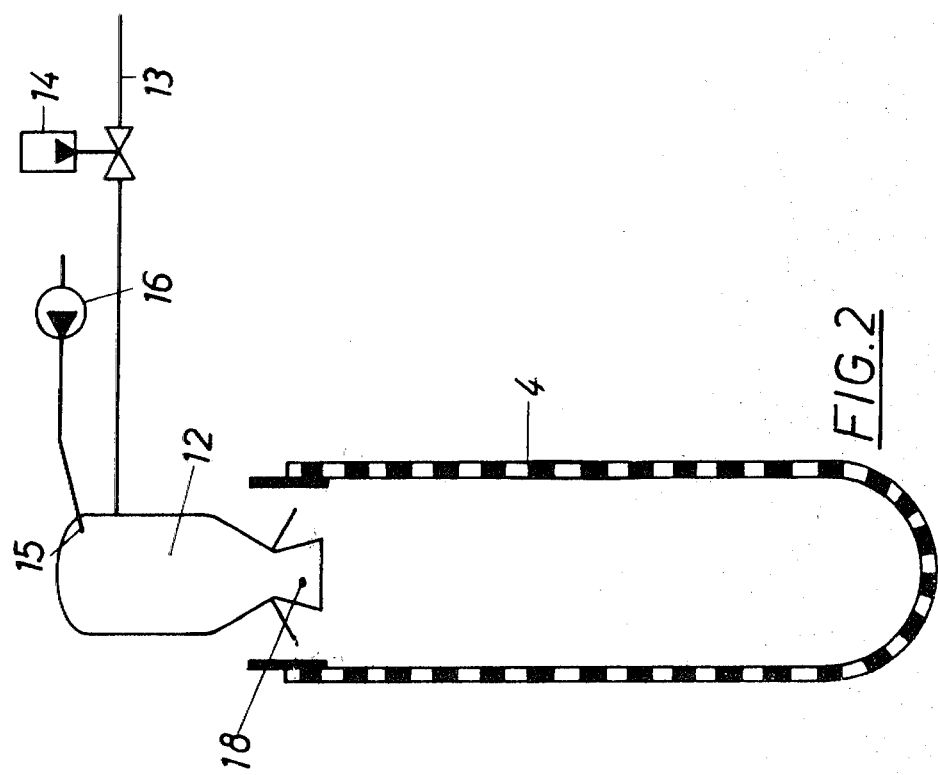
FIG. 2 is a schematic section of a filter insert with associated parts.

The filter inserts 4 can be shaped as shown in FIG. 2. The inserts are fixed in a suitable way inside the housing of the filter 1. Details are not shown. The filter material of the filter inserts 4 is a fibrous material consisting of silicic-acid glass fibers. The filter material may be of a textile webbing or felted structure. The fibers of the filter material itself are specially treated. They have been treated at higher temperatures with diluted acids, especially with diluted hydrochloric acid. During this treatment the non-silicic-acid oxides of the fibers are removed to such an extent that the silicic-acid content of the fibers is 90% to almost 100%. Afterward, the glass fibers are washed to remove the acid and especially the soluble particles, as well as dried at a temperature of 100° C. Then the filters or the filter materials are saturated with a solution of 1 to 3% of a salt of titanium, aluminum or zirconium, whereby the respective hydroxide is settled out by adding a concentrated ammonia solution. It is advantageous to use the anhydrous metal chlorides, i.e., the metals in combination with their water-free chlorides, such as $Ti, Cl_4$, $Zr\ Cl_4$, $Al\ Cl_3$, because those chlorides will hydrolize immediately in a water solution, and, by adding a water-ammonia solution, a very fine hydroxide-gel will precipitate, which will bond extraordinarily well to the porous glass fibers. After accumulation of the desired quantity of hydroxides on the glass fibers, they are rinsed with water, dried at approximately 100° C. and finally treated with heat between 800° to 900° C. During the heat treatment, the accumulated metal-hydroxides will be transformed into the respective metal-oxides. Because of the resultant coating with the metal-oxides, the glass fibers will obtain good mechanical properties, especially a high flexibility and bending strength even at high temperatures, so that they are highly suitable for use in high temperature filters.

Figure 3:
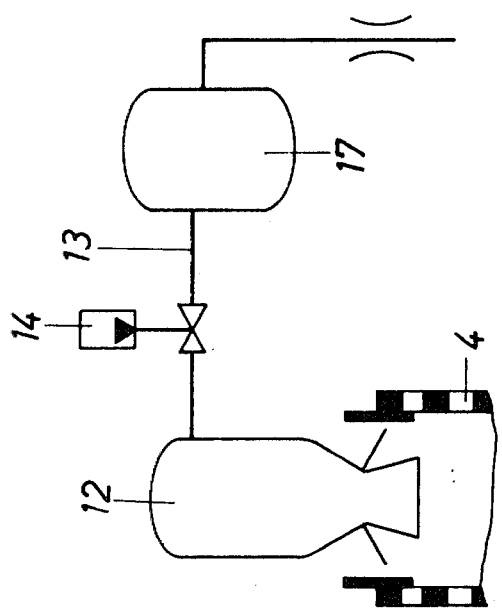
FIG. 3 is a schematic section of another type of filter insert with associated parts.

Those new extraordinary mechanical properties also allow the cleaning of the filters with a simple arrangement being described in the following, and as illustrated in FIGS. 2 and 3. Behind the filter inserts 4 a chamber 12 is installed, which is formed as a combustion chamber. Into chamber 12, a line 13 filled with combustion air leads. Line 13 can be closed by a regulating valve. Selectively or in addition, a fuel line 15 can also lead into chamber 12. Fuel line 15 can be closed with a regulating valve 16.

The chamber 12 is opened to one side and has a discharge nozzle 18 pointing at the filter inserts 4. This arrangement works in the following way. If gases to be cleaned contain inflammable compounds, a portion of the gases having been cleaned in the filter inserts 4 will collect in the combustion chamber 12. From time to time a certain amount of combustible air will be inserted through the line 13 into the chamber 12 by opening the regulating valve 14. Under the influence of the existing temperatures, the thus formed mixture will ignite itself, forming a pressure wave, which discharges together with the exhaust gas developed from the combustion at the nozzle 18 and cleans the filter material by impact in gushes. The resultant shock and mechanical strain together with the movement of the filter materials cause the cleaning. The cleaning is supported by the exhaust gas flowing through the discharge nozzle 18 which acts as a flushing gas. If the gases to be cleaned do not contain any combustible material, an oil fuel is injected through the line 15 together with the combustion air, so that in the chamber 12 in any case an ignitable mixture will be formed. The effect will be the same as described above.

An important advantage of the described arrangement is that for the cleaning of the filters practically no movable parts are necessary. Even the support and fixing devices for the filter inserts do not have to be moved. The pressure under which the combustible air and/or the oil fuel has to be injected into the chamber can be relatively low. In any case, it has to be only insignificantly higher than the pressure of the gases to be cleaned. The nature of the pressure wave and especially the steepness of the slope of the pressure impulse caused by the pressure wave can be regulated by the injection of the combustion air and/or oil fuel in such a way that "hard", short impulses as well as "soft", long impulses can be attained.

If "hard", short pressure impulses should be produced, a type as shown in FIG. 3 should be selected. A pressure reservoir 17 is attached to the line 13 and is filled with combustion air. By regulating the valve 14, a certain amount of combustion air can be intermittently injected into the chamber 12 in such a way that the combustion process will last only for a short period causing a pressure wave with a steep slope. In general, the combustion in the chamber 12 is the same as the so-called diesel process.

We claim:

1. An apparatus for cleaning hot gases comprising a filter housing having an inlet for unfiltered gas and an outlet for filtered gas, and a plurality of filter inserts placed within the housing in a manner capable of filtering undesirable components from the gas feed stream, each said filter insert comprising a fibrous filter material, the fibers consisting of silicic-acid glass fibers with a silicic-acid content of at least 90%, absorbed into the pores of which and coated upon which is a metal oxide of at least one of the group consisting of aluminum, titanium, zirconium, chromium, nickel, or cobalt, further comprising a cage of a honeycombed structure filled with expanded high temperature resistant perlite located within the housing between the gas inlet and the filter inserts, wherein the cage has an inlet and an outlet, both external to the housing, for effecting replacement of the perlite, and further comprising a combustion chamber mounted within said housing having a discharge nozzle located so that said nozzle is directed at the filter inserts, said combustion chamber having means for the insertion of combustible air connected thereto, whereby combusting materials in the chamber causes an explosive backflow of gases through the filter inserts.

2. An apparatus according to claim 1 wherein means for the insertion of fuel for combustion is connected to said combustion chamber.

3. An apparatus according to claim 1 wherein the means for the insertion of combustible air further comprises a pressure reservoir connected to said means.

4. An apparatus according to claim 1 wherein means for the insertion of fuel for combustion is connected to said combustion chamber.

* * * * *